United States Patent
Zhang

(10) Patent No.: US 10,977,912 B2
(45) Date of Patent: Apr. 13, 2021

(54) METHOD AND DEVICE FOR DETECTING BREAKAGE OF WINDOW GLASS

(71) Applicant: AAC ACOUSTIC TECHNOLOGIES (SHENZHEN) CO., LTD., Shenzhen (CN)

(72) Inventor: Jinyu Zhang, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/992,137

(22) Filed: Aug. 13, 2020

(65) Prior Publication Data
US 2020/0410829 A1    Dec. 31, 2020

Related U.S. Application Data

(63) Continuation of application No. PCT/CN2019/093336, filed on Jun. 27, 2019.

(51) Int. Cl.
*G08B 13/04* (2006.01)

(52) U.S. Cl.
CPC .................................. *G08B 13/04* (2013.01)

(58) Field of Classification Search
CPC combination set(s) only.
See application file for complete search history.

(56) References Cited

U.S. PATENT DOCUMENTS

| | | | |
|---|---|---|---|
| 10,089,851 B1 * | 10/2018 | Singh | G08B 13/04 |
| 2018/0286209 A1 * | 10/2018 | Singh | G08B 13/04 |
| 2019/0012897 A1 * | 1/2019 | Singh | G08B 21/182 |

* cited by examiner

*Primary Examiner* — Travis R Hunnings
(74) *Attorney, Agent, or Firm* — W&G Law Group LLP

(57) ABSTRACT

The invention provides a method and a device for detecting breakage of window glass. The device includes a signal generator and a signal receiver. The method includes: controlling the control signal generator to send out a source signal if the door is locked; using the signal receiver for receiving the source signal at the first time; determining whether a signal strength of the source signal exceeds a first threshold; controlling the device to enter a window breakage monitoring mode if the first threshold is exceeded; using the signal receiver for receiving the source signal which is sent by the signal generator at the second time; determining whether a signal strength of the source signal sent at the second time exceeds a second threshold; performing a preset first alarm operation if the second threshold is exceeded. This method has high accuracy and high reliability.

8 Claims, 3 Drawing Sheets

METHOD AND DEVICE FOR DETECTING BREAKAGE OF WINDOW GLASS

FIELD OF THE PRESENT INVENTION

The invention relates to the technical field of window glass detection, and more particularly to a method and a device for detecting breakage of window glass.

DESCRIPTION OF RELATED ART

With the improvement of living standards, vehicles have become an important part of people's lives. A window glass is an important component of the vehicle, but it is also a relatively fragile and easily broken component of the vehicle.

Therefore, how to achieve reliable monitoring of whether the window glass installed on the vehicle is broken so that the owner can know in time whether the vehicle has an accident, is a technical problem to be solved in the art.

SUMMARY OF THE PRESENT INVENTION

The present invention provides a method and a device for detecting breakage of window glass, aiming to achieve reliable monitoring of whether a window glass arranged on a vehicle is broken.

To achieve the above object, the present invention provides a method for detecting breakage of window glass, which is applied to a device for detecting breakage of window glass installed in a vehicle. The device for detecting breakage of the window glass is provided with a window breakage monitoring mode and includes a signal generator and a signal receiver. The signal generator is arranged outside a body of the vehicle, and the signal receiver is disposed inside the body of the vehicle. The method includes: detecting whether a door of the vehicle is locked; controlling the control signal generator to send out a source signal if the door is locked; using the signal receiver for receiving the source signal which is sent by the signal generator at the first time, wherein the first time is a corresponding time before the device for detecting breakage of window glass enters the window breakage monitoring mode; determining whether a signal strength of the source signal sent at the first time exceeds a first threshold; controlling the device for detecting breakage of window glass to enter the window breakage monitoring mode if the signal strength of the source signal sent at the first time does not exceed the first threshold; using the signal receiver for receiving the source signal which is sent by the signal generator at the second time, wherein the second time is a corresponding time after the device for detecting breakage of window glass enters the window breakage monitoring mode; determining whether a signal strength of the source signal sent at the second time exceeds a second threshold; and performing a preset first alarm operation if the signal strength of the source signal sent at the second time exceeds the second threshold.

Preferably, if the signal strength of the source signal issued at the first time exceeds the first threshold, a preset second alarm operation is performed.

Preferably, the device for detecting breakage of window glass is electrically connected to an on-board computer installed in the vehicle, and detecting whether the door of the vehicle is locked includes: detecting whether a door locked signal sent by the on-board computer is received, wherein the door locked signal is a signal which is sent to the device for detecting breakage of window glass by the on-board computer after the vehicle door is locked; determining the door of the vehicle being in a locked state if the door locked signal is received.

Preferably, performing the preset first alarm operation includes: sending a first control information to a horn of the vehicle for controlling the horn to generate sound.

Preferably, the device for detecting breakage of window glass is provided with a signal transmitter, and performing the preset first alarm operation includes: sending a second control information to the signal transmitter for controlling the signal transmitter to send an alarm information to a preset terminal device.

Preferably, the signal generator is an ultrasonic generator, the source signal is an ultrasonic signal, and the signal receiver is an ultrasonic signal receiver.

To achieve the above object, the present invention further provides a device for detecting breakage of window glass, which is installed on a vehicle and provided with a window breakage monitoring mode. The device for detecting breakage of window glass includes a signal generator, a signal receiver, a memory and a processor.

The signal generator is arranged outside a body of the vehicle, and the signal receiver is arranged inside the body of the vehicle. The signal generator and the signal receiver are both electrically connected to the processor.

The memory is used for storing a computer-executable detecting program of window glass breakage.

The processor is used for extracting the executable detecting program of window glass breakage stored in the memory to perform the aforementioned method.

To achieve the above object, the present invention further provides a storage medium which stores an executable calculation program. When the executable calculation program is executed, the aforementioned method is implemented.

Compared with the prior art, the method and device for detecting breakage of window glass of the present invention have the following advantages.

By determining whether a vehicle door is locked, the signal generator arranged outside the vehicle body is controlled to generate a source signal after the vehicle door is locked. The signal receiver arranged inside the vehicle is used for receiving a source signal issued at the first time. When a signal strength of the source signal does not exceed a preset first threshold, the device for detecting breakage of window glass is controlled to enter a window breakage monitoring mode to monitor whether the window glass is broken.

After the device for detecting breakage of window glass enters the window breakage monitoring mode, the signal receiver is used for receiving the source signal sent by the signal generator corresponding to a second time after the device for detecting breakage of window glass enters the window breakage monitoring mode. By determining whether a signal strength of the source signal sent at the second time exceeds a second threshold, if the signal strength exceeds the preset second threshold, the vehicle window is determined to be broken, and the preset first alarm operation is performed.

DETAILED DESCRIPTION OF THE EXEMPLARY EMBODIMENT

Figure 1:
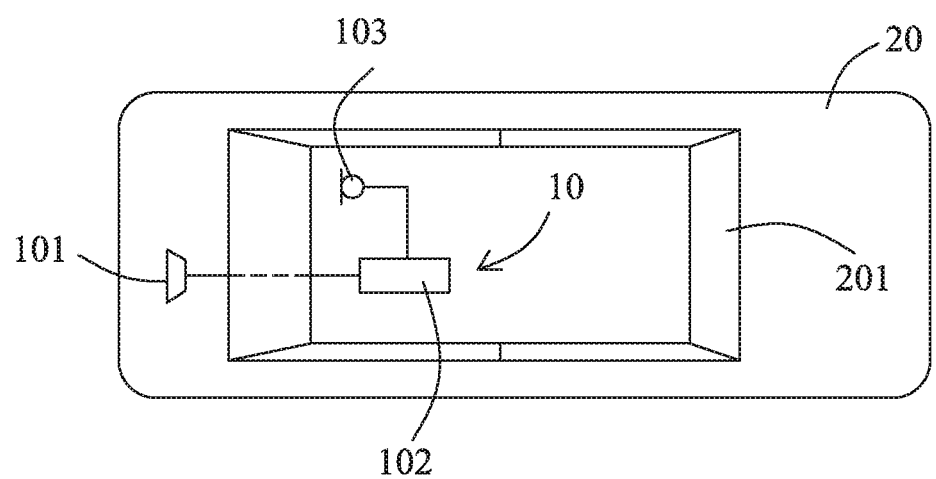
FIG. 1 is a frame diagram of an application scenario of a method for detecting breakage of window glass according to the present invention.

In order to make the purpose, technical scheme and advantages of the present invention clearer and obvious, the present invention will be further illustrated in detail in combination with accompanying drawings and embodiments hereinafter. It should be understood that the specific embodiments described herein are only used to illustrate the present invention, and are not intended to limit the present invention.

The terms "first", "second", "third", "fourth", and the like in the description and claims of the present invention and the above drawings, are used for distinguishing between similar objects and not necessarily for describing a specific or chronological order. It should be understood that the data used in this way can be interchanged under appropriate circumstances, so that the embodiments described herein can be implemented in an order other than what is illustrated or described herein. In addition, the terms 'include' and 'have' and any variations thereof are intended to cover non-exclusive inclusions. For example, a process, method, system, product, or device which includes a series of steps or units is not necessarily limited to list out those steps or units clearly, but can include other steps or units not explicitly listed or other inherent steps or units of the process, method, product, or device.

It should be noted that the descriptions related to "first", "second", and the like in the present invention are used for describing purposes only, and cannot be understood as indicating or implying their relative importance or implicitly indicating the number of indicated technical features. Therefore, the features defined as "first" and "second" may include at least one of the features explicitly or implicitly. In addition, the technical solutions among the various embodiments can be combined with one another, but it must be based on those skilled in the art who can achieve. When the combination of technical solutions is conflicted or cannot be realized, it should be considered that the combination of the technical solution does not exist, nor within the scope of protection required by the present invention.

The present invention provides a method and a device for detecting breakage of window glass, wherein the method for detecting breakage of window glass is applied to the device for detecting breakage of window glass installed in a vehicle. The device for detecting breakage of window glass is provided with a window breakage monitoring mode, which device includes a signal generator and a signal receiver. The signal generator is arranged outside a body of the vehicle, and the signal receiver is arranged inside the body of the vehicle. The method includes: detecting whether a door of the vehicle is locked; controlling the control signal generator to send out a source signal if the door is locked; using the signal receiver for receiving the source signal which is sent by the signal generator at the first time, wherein the first time is a corresponding time before the device for detecting breakage of window glass enters the window breakage monitoring mode; determining whether the signal strength of the source signal sent at the first time exceeds a first threshold; controlling the device for detecting breakage of window glass to enter the window breakage monitoring mode if the signal strength of the source signal sent at the first time does not exceed the first threshold; using the signal receiver for receiving the source signal which is sent by the signal generator at the second time, wherein the second time is a corresponding time after the device for detecting breakage of window glass enters the window breakage monitoring mode; determining whether the signal strength of the source signal sent at the second time exceeds the second threshold; performing the preset first alarm operation if the signal strength of the source signal sent at the second time exceeds the second threshold.

By determining whether the vehicle door is locked, the signal generator arranged outside the vehicle body is controlled to generate the source signal after the vehicle door is locked. The signal receiver arranged inside the vehicle is used for receiving the source signal issued at the first time. When the signal strength of the source signal does not exceed the preset first threshold, the device for detecting breakage of window glass is controlled to enter the window breakage monitoring mode to monitor whether the window glass is broken.

After the device for detecting breakage of window glass enters the window breakage monitoring mode, the signal receiver is used for receiving the source signal sent by the signal generator corresponding to the second time after the device for detecting breakage of window glass enters the window breakage monitoring mode. By determining whether the signal strength of the source signal sent at the second time exceeds the second threshold, if the signal strength of the source signal sent at the second time exceeds the preset second threshold, the vehicle window is determined to be broken, and the preset first alarm operation is performed. This method has high accuracy and high reliability.

Figure 2:
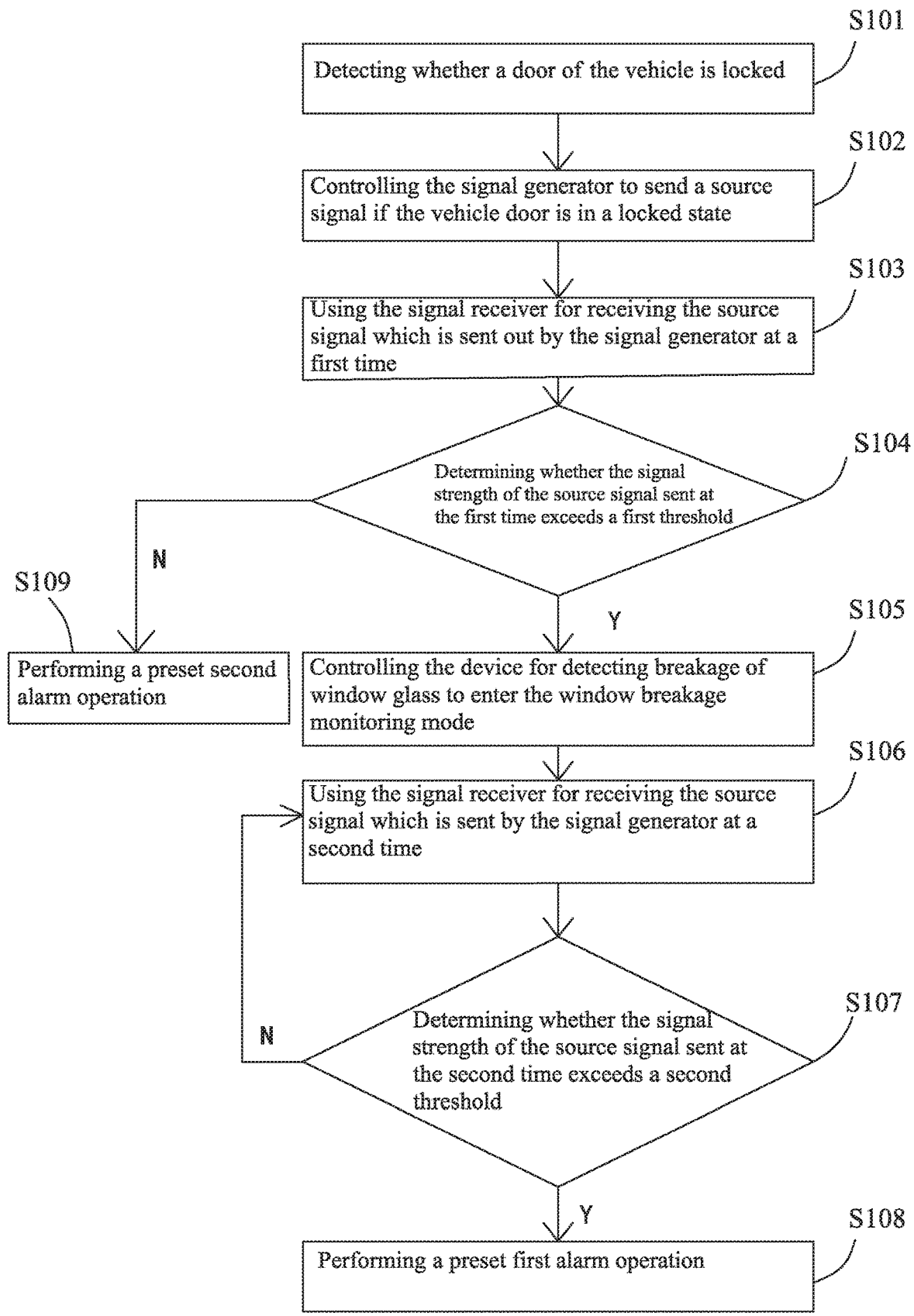
FIG. 2 is a flowchart of steps of the method for detecting breakage of window glass according to the present invention.

Please refer to FIG. 1 to FIG. 2, wherein FIG. 1 is a frame diagram of an application scenario of a method for detecting breakage of window glass of the present invention.

A device for detecting breakage of window glass 10 is installed on a vehicle 20. The device for detecting breakage of window glass 10 includes a signal generator 101, a signal receiver 103, and a signal processor 102 which is electrically connected with the signal generator 101 and the signal receiver 103. The signal generator 101 is provided outside a body of the vehicle 20, and the signal receiver 103 is arranged inside the body of the vehicle 20. The signal generator 101 is used to generate a source signal, and the signal receiver 103 is used to receive the source signal sent out by the signal generator 101 and to transmit the received source signal to the signal processor 102, so that the signal processor 102 can recognize a signal strength of the source signal received by the signal receiver 103.

When the source signal is transmitted from outside of the vehicle body to inside of the vehicle body, if a vehicle window 201 is closed, the transmission of the source signal is blocked by the vehicle window 201, and the strength of the source signal can be attenuated. If the vehicle window 201 is opened or broken, the blocking effect of the vehicle window 201 on the source signal is reduced or has no blocking effect, so that the strength of the source signal will also change accordingly. Therefore, according to the strength of the source signal received by the signal receiver 103, it can be analyzed whether the window vehicle 201 is open or broken.

The device for detecting breakage of window glass 10 is provided with a window breakage monitoring mode. When the device for detecting breakage of window glass 10 enters the window breakage monitoring mode, a preset operation can be performed according to the signal strength received by the signal receiver 103. The preset operation may be that if the vehicle window 201 is broken, a prompt message is sent to the user, or an alarm device installed on the vehicle 20 is controlled to alarm.

In the embodiment, the signal generator 101 may be an ultrasound generator or a wireless signal generator, and the signal receiver 103 may be a corresponding ultrasound receiver or wireless signal receiver, which is not limited herein.

Referring to FIG. 2, FIG. 2 is a flowchart of steps of a method for detecting breakage of window glass. The method for detecting breakage of window glass is applied to the device for detecting breakage of window glass 10. The method includes:

step S101: detecting whether a door of the vehicle is locked. In some embodiments, the device for detecting breakage of window glass is electrically connected with an on-board computer installed in the vehicle. Detecting whether the door of the vehicle is locked includes:

detecting whether the door locked signal sent by the on-board computer is received, wherein the door locked signal is a signal that the on-board computer sends to the device for detecting breakage of window glass after the door of the vehicle is locked;

determining the vehicle door being in a locked state if the door locked signal is received;

determining the vehicle door being in a unlocked state if the door locked signal is not received.

Exemplarily, after the door of the vehicle 20 is locked, the on-board computer in the vehicle 20 can detect the door locked signal. After the door locked signal is received by the on-board computer, the on-board computer sends the door locked signal to the device for detecting breakage of window glass 10. As a result, the device for detecting breakage of window glass 10 can know that the door of the vehicle 20 is in the locked state, and then a corresponding preset operation is performed.

Step S102: controlling the signal generator to send the source signal if the vehicle door is in the locked state. When the vehicle door is in the locked state, the device for detecting breakage of window glass 10 sends the control signal to the signal generator 101, thus to control the signal generator 101 installed outside the vehicle body to send out the source signal. The signal generator 101 may be an ultrasound generator or a wireless signal generator.

Step S103: using the signal receiver for receiving the source signal which is sent out by the signal generator at a first time, wherein the first time is a corresponding time before the device for detecting breakage of window glass enters the window breakage monitoring mode.

Before the device for detecting breakage of window glass 10 enters the window breakage monitoring mode, it is necessary to ensure that the vehicle window 201 of the vehicle 20 is in a closed state. The signal receiver 103 arranged in the vehicle 20 is used for receiving the source signal which is sent by the signal generator 101 at the corresponding time before the device for detecting breakage of window glass 10 enters the window breakage monitoring mode, thus to determine whether the vehicle window 201 is closed according to the strength of the source signal obtained within the time.

Step S104: determining whether the signal strength of the source signal sent at the first time exceeds a first threshold. When the vehicle window 201 is closed, the signal receiver 103 receives the source signal sent by the signal generator 101 and transmits the source signal to the signal processor 102, thus to determine whether the strength of the source signal received by the signal receiver 103 exceeds the preset first threshold.

Step S105: controlling the device for detecting breakage of window glass to enter the window breakage monitoring mode if the first threshold is not exceeded by the signal strength of the source signal sent at the first time.

If the first threshold is not exceeded by the signal strength of the source signal sent at the first time, it indicates that the vehicle window 201 of the vehicle 20 is not opened or unbroken, and the device for detecting breakage of window glass 10 is controlled to enter the window breakage monitoring mode to detect the state of the vehicle window.

Step S106: using the signal receiver for receiving the source signal which is sent by the signal generator at a second time, wherein the second time is a corresponding time after the device for detecting breakage of window glass enters the window breakage monitoring mode.

After the device for detecting breakage of window glass 10 enters the window breakage monitoring mode, the signal receiver 103 is used for receiving the source signal which is sent out by the signal generator 101 at the second time. The second time is the corresponding time after the device for detecting breakage of window glass 10 enters the window breakage monitoring mode, so that it can be known in time whether the vehicle window 201 is broken or opened after the device for detecting breakage of window glass 10 enters the window breakage monitoring mode.

Step S107: determining whether the signal strength of the source signal sent at the second time exceeds a second threshold. The signal receiver 103 receives the source signal which is sent out by the signal generator 101 at the second time and transmits the source signal to the signal processor 102, thus to determine whether the strength of the source signal received by the signal receiver 103 exceeds the preset second threshold.

Step S108: performing a preset first alarm operation if the signal strength of the source signal sent out at the second time exceeds the second threshold.

In some embodiments, performing the preset first alarm operation includes: sending a first control information to a horn of the vehicle for controlling the horn to generate sound.

In some embodiments, the device for detecting breakage of window glass further includes a signal transmitter installed on the vehicle. Performing the preset first alarm operation includes: sending a second control signal to the signal transmitter for controlling the signal transmitter to send the alarm information to a preset terminal device, wherein the terminal device may be a mobile phone or a computer.

Exemplarily, after the device for detecting breakage of window glass 10 enters the window breakage monitoring mode, if the signal strength from the source signal 103 received by the signal receiver 103 exceeds the preset second threshold, it indicates that the vehicle window 201 has been broken or opened. Therefore, the horn provided on the vehicle 20 can be controlled to generate sound, or the signal transmitter provided on the vehicle 20 can be controlled to send a prompt message to the user's mobile phone or computer.

In some embodiments, the method further includes: if the second threshold is not exceeded by the signal strength of the source signal sent at the second time, returning to step S106.

In some embodiments, the method further includes step S109: sending a second alarm if the signal strength of the source signal sent at the first time exceeds the first threshold.

If the signal strength of the source signal received by the signal generator 103 exceeds the first threshold before the device for detecting breakage of window glass 10 enters the window breakage monitoring mode, it indicates that the vehicle window 201 is opened or broken, so a second warning message is send to remind users to close the vehicle window or to repair the broken window in time.

Figure 3:
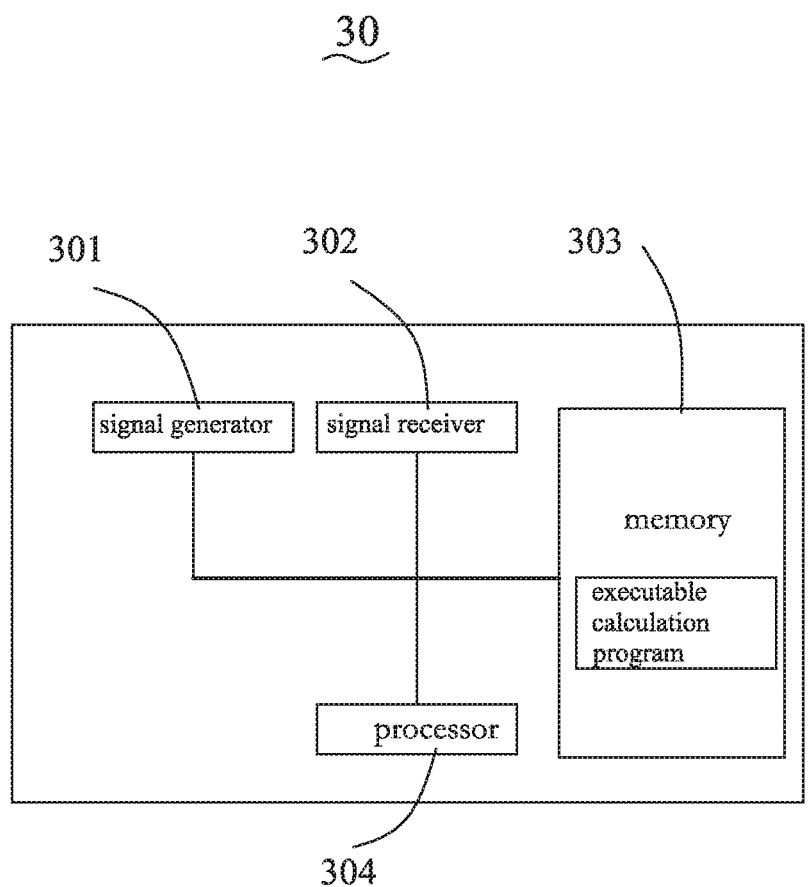
FIG. 3 is a structural block diagram of a device for detecting breakage of window glass according to an embodiment of the present invention.

Please refer to FIG. 3, the present invention further provides a device for detecting breakage of a window glass 30. The device for detecting breakage of a window glass 30 is installed in the vehicle 20 and is provided with a window breakage monitoring mode. The device for detecting breakage of the window glass 30 includes a signal generator 301, a signal receiver 302, a memory 303 and a processor 304, wherein the signal generator 301 is provided outside a body of the vehicle 20, and the signal receiver 103 is provided inside the body of the vehicle 20. Both the signal generator 301 and the signal receiver 302 are electrically connected to the processor 304 through a bus.

The memory 303 includes at least one type of readable storage medium. The readable storage medium includes a flash memory, a hard disk, a multimedia card, a card-type memory (for example, SD or DX memory, etc.), a magnetic memory, a magnetic disk, an optical disk, and the like. The memory 303 may be an internal storage unit of the device for detecting breakage of the window glass 30 in some embodiments, for example, a hard disk of the device for detecting breakage of window glass 30. In other embodiments, the memory may also be an external storage device of the device for detecting breakage of the window glass, for example, a plug-in hard disk, a smart memory card, a secure digital card, a flash card, etc. equipped on the device for detecting breakage of the window glass. The memory 303 can be used for storing application software and various types of data installed in the device for detecting breakage of the window glass 30, exemplarily, computer readable program codes, such as a detecting program of window glass breakage, that is, the memory 303 can be used as a storage medium.

In some embodiments, the processor 304 may be a central processing unit, a controller, a micro-controller, a microprocessor, or other data processing chips. The program code or process data stored in the memory 303 may be called by the processor 304, so as to implement the aforementioned method for detecting breakage of the window glass.

In addition, the embodiment of the present invention further provides a storage medium, which is a computer readable storage medium. The storage medium stores an executable calculation program. When the executable calculation program is executed, the aforementioned method for detecting breakage of the window glass is realized.

The above description is only preferred embodiment of the present invention, and it should be noted that those skilled in the art can also make improvements without departing from the inventive concept of the present invention, but these improvements all belong to the protection scope of the invention.

What is claimed is:

1. A method for detecting breakage of window glass which is applied to a device for detecting breakage of window glass installed in a vehicle, wherein the device for detecting breakage of window glass includes a signal generator and a signal receiver, the signal generator is arranged outside a body of the vehicle, and the signal receiver is arranged inside the body of the vehicle;

the device for detecting breakage of window glass is provided with a window breakage monitoring mode, and the method includes:
detecting whether a door of the vehicle is locked;
controlling the control signal generator to send out a source signal if the door is locked;
using the signal receiver for receiving the source signal which is sent by the signal generator at the first time, wherein the first time is a corresponding time before the device for detecting breakage of window glass enters the window breakage monitoring mode;
determining whether a signal strength of the source signal sent at the first time exceeds a first threshold;
controlling the device for detecting breakage of window glass to enter the window breakage monitoring mode if the signal strength of the source signal sent at the first time does not exceed the first threshold;
using the signal receiver for receiving the source signal which is sent by the signal generator at the second time, wherein the second time is a corresponding time after the device for detecting breakage of window glass enters the window breakage monitoring mode;
determining whether a signal strength of the source signal sent at the second time exceeds a second threshold;
performing a preset first alarm operation if the signal strength of the source signal sent at the second time exceeds the second threshold.

2. The method for detecting breakage of window glass according to claim 1, wherein the method further includes:
performing a preset second alarm operation if the signal strength of the source signal issued at the first time exceeds the first threshold.

3. The method for detecting breakage of window glass according to claim 1, wherein the device for detecting breakage of window glass is electrically connected to an on-board computer installed in the vehicle, and detecting whether the door of the vehicle is locked includes:
detecting whether a door locked signal sent by the on-board computer is received, wherein the door locked signal is a signal which is sent to the device for detecting breakage of window glass by the on-board computer after the vehicle door is locked;
determining the door of the vehicle being a locked state if the door locked signal is received.

4. The method for detecting breakage of window glass according to claim 1, wherein performing the preset first alarm operation includes:
sending a first control information to a horn of the vehicle for controlling the horn to generate sound.

5. The method for detecting breakage of window glass according to claim 1, wherein the device for detecting breakage of window glass is provided with a signal transmitter, and performing the preset first alarm operation includes:
sending a second control information to the signal transmitter for controlling the signal transmitter to send an alarm information to a preset terminal device.

6. The method for detecting breakage of window glass according to claim 1, wherein the signal generator is an ultrasonic generator, the source signal is an ultrasonic signal, and the signal receiver is an ultrasonic signal receiver.

7. A device for detecting breakage of window glass, which is installed in a vehicle and is provided with a window breakage monitoring mode, wherein the device for detecting breakage of window glass includes a signal generator, a signal receiver, a memory and processor;

the signal generator is provided outside the body of the vehicle, the signal receiver is provided inside the body of the vehicle, and the signal generator and the signal receiver are both electrically connected with the processor;

the memory is used for storing a computer-executable detecting program of window glass breakage;

the processor is used for extracting the executable detecting program of window glass breakage stored in the memory to perform the method according to claim 1.

8. A storage medium, wherein the storage medium stores an executable calculation program, when the executable calculation program is executed, the method according to claim 1 is implemented.

\* \* \* \* \*